(12) United States Patent
Doi

(10) Patent No.: US 8,977,487 B2
(45) Date of Patent: Mar. 10, 2015

(54) NAVIGATION DEVICE AND GUIDE ROUTE SEARCH METHOD

(75) Inventor: Shinobu Doi, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 227 days.

(21) Appl. No.: 13/046,231

(22) Filed: Mar. 11, 2011

(65) Prior Publication Data

US 2011/0251783 A1 Oct. 13, 2011

(30) Foreign Application Priority Data

Apr. 12, 2010 (JP) .................................. 2010-091817

(51) Int. Cl.
*G08G 1/0968* (2006.01)
*G01C 21/34* (2006.01)

(52) U.S. Cl.
CPC ...... *G01C 21/3446* (2013.01); *G08G 1/096827* (2013.01)
USPC ............................ 701/411; 701/410; 701/533

(58) Field of Classification Search
USPC .......... 701/408, 409, 410, 411, 420, 532, 533
See application file for complete search history.

(56) References Cited

U.S. PATENT DOCUMENTS

| 5,031,104 | A | * | 7/1991 | Ikeda et al. | 701/428 |
|---|---|---|---|---|---|
| 5,506,774 | A | * | 4/1996 | Nobe et al. | 701/423 |
| 5,612,881 | A | * | 3/1997 | Moroto et al. | 701/428 |
| 5,899,955 | A | * | 5/1999 | Yagyu et al. | 701/410 |
| 5,931,888 | A | * | 8/1999 | Hiyokawa | 701/428 |
| 6,101,443 | A | * | 8/2000 | Kato et al. | 701/414 |
| 6,795,769 | B2 | | 9/2004 | Kaji et al. | |
| 6,978,207 | B2 | * | 12/2005 | Katou | 701/414 |
| 2003/0028318 | A1 | | 2/2003 | Kaji et al. | |
| 2007/0179708 | A1 | * | 8/2007 | Sekine et al. | 701/208 |
| 2007/0250264 | A1 | * | 10/2007 | Sekine et al. | 701/208 |

FOREIGN PATENT DOCUMENTS

| JP | 06-309595 | 11/1994 |
|---|---|---|
| JP | 10-153447 | 6/1998 |
| JP | 2002-107164 | 4/2002 |
| JP | 2002-243476 | 8/2002 |
| JP | 2003-185450 | 7/2003 |
| JP | 2004-101447 | 4/2004 |
| JP | 2011-191065 | 9/2011 |

OTHER PUBLICATIONS

Japanese Office Action for Japanese Patent Application No. 2010-091817 dated Jan. 17, 2014.

* cited by examiner

*Primary Examiner* — Helal A Algahaim
*Assistant Examiner* — Dale W Hilgendorf
(74) *Attorney, Agent, or Firm* — Brinks Gilson & Lione

(57) ABSTRACT

A navigation device and a guide route search method prevents searching for a detour route, and shortens the time required for setting an eventual guide route. A first partial route is extracted from a first guide route found in accordance with map data divided into three hierarchical levels, based on information about a road network. The first guide route is the route from the current location to a destination. A second partial route is obtained by performing a route search between the nodes at opposite ends of the first partial route, based on the map data containing the lowest level. A second guide route is obtained by replacing the first partial route in the first guide route with the second partial route, and is set as the eventual guide route.

14 Claims, 10 Drawing Sheets

FIG. 5A
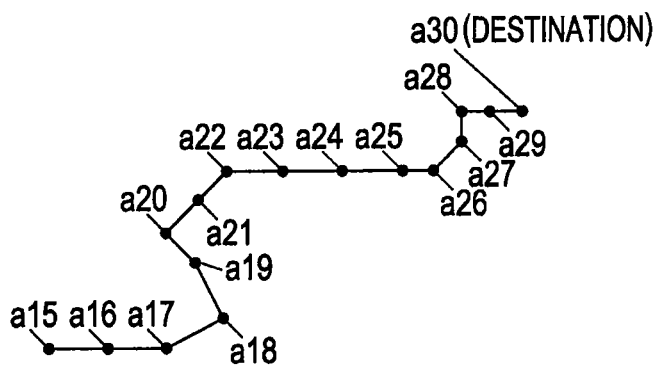
FIG. 5B
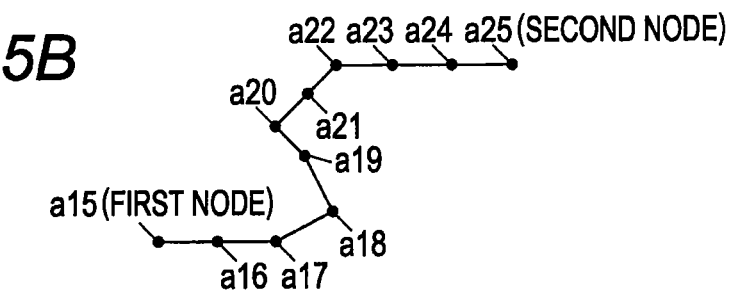
FIG. 5C
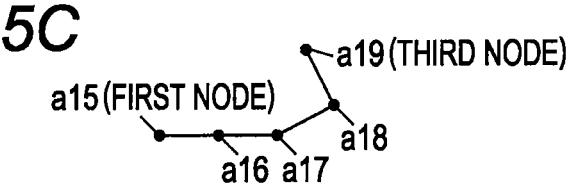
FIG. 5D
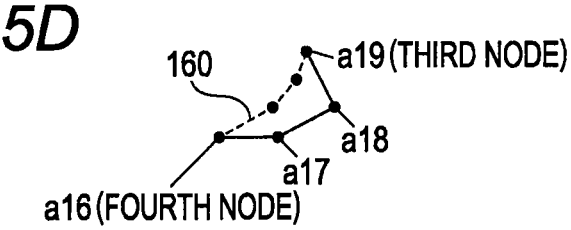

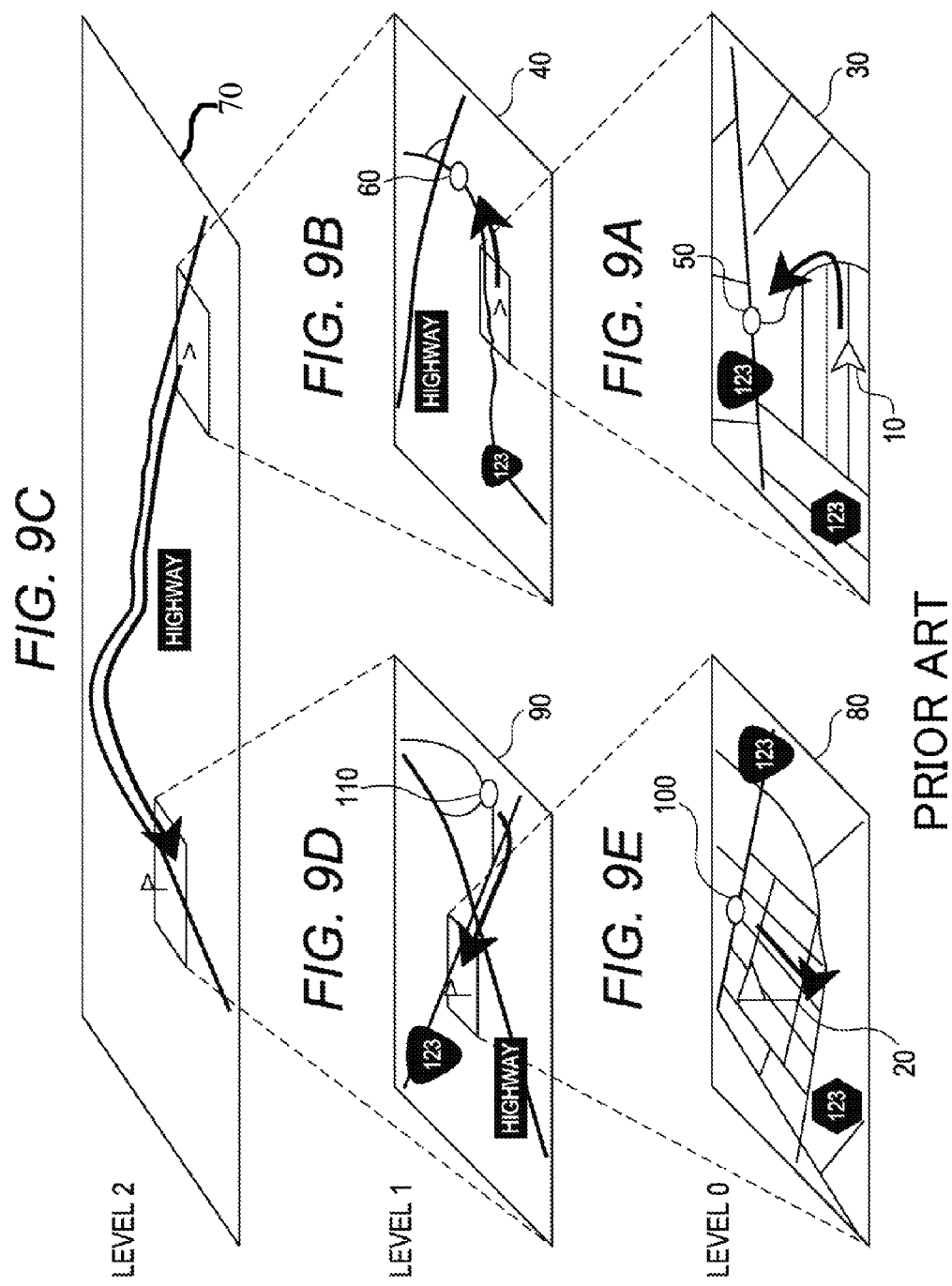

PRIOR ART

NAVIGATION DEVICE AND GUIDE ROUTE SEARCH METHOD

PRIORITY CLAIM

This application claims the benefit of Japanese Patent Application No. 2010-091817, filed on Apr. 12, 2010, and which is incorporated by reference herein in its entirety.

BACKGROUND

1. Field of the Invention

The present invention generally relates to a navigation device and a guide route search method, and more particularly, to a technique suitable for a navigation device that has a route guide function to automatically search for the most cost-saving route from the current location to a destination with the use of map data.

2. Description of the Related Art

Most navigation devices have a route guide function that enables drivers to easily travel to desired destinations without taking wrong paths. The route guide function automatically searches for the most cost-effective route from the current location to each destination with the use of map data.

The map data used in route searches has a structure that is divided into hierarchical levels based on the variation in the amount of information about a road network. For example, map data divided into three hierarchical levels contain a road mesh called level 0 that covers all roads from narrow streets to expressways, a road mesh called level 1 that mainly covers city roads and roads wider than city roads, and a road mesh called level 2 that covers roads such as expressways and toll roads. Those road meshes are distinguished from one another in the map data. In this case, as the level becomes higher, the map data becomes coarser and contains a smaller amount of information about the road network.

To restrict the amount of arithmetic operation for route searches, calculations are normally performed in the following manner. In the surrounding areas of the current location and a destination, a specific calculation is performed with the use of the map data of the lower level (level 0). In the intermediate region of the route, a rough calculation is performed with the use of the map data of the higher levels (level 1 and higher). The results of both calculations are integrated to output a guide route. Referring now to FIGS. 9A through 9E, a route searching operation according to such a method will be described in detail.

FIGS. 9A through 9E illustrate an operation to search for a guide route from a current location 10 shown in FIG. 9A to a destination 20 shown in FIG. 9E. First, as shown in FIG. 9A, in the surrounding area of the current location 10, a search for a guide route is performed with the use of a road mesh 30 of level 0 that covers all the roads. When the search branch reaches an uplink point 50 to a road mesh 40 of level 1 (the connecting point from the road mesh 30 of level 0 to the road mesh 40 of level 1), a route search is performed by switching to the road mesh 40 of level 1 containing the link corresponding to the uplink point 50, as shown in FIG. 9B. Likewise, the search branch reaches an uplink point 60 to level 2 (the connecting point from the road mesh 40 of level 1 to a road mesh 70 of level 2) after the route search at level 1, a route search is performed by switching to the road mesh 70 of level 2 shown in FIG. 9C.

Meanwhile, in the surrounding area of the destination 20, a route search is performed with the use of a road mesh 80 of level 0 that covers all the roads, as shown in FIG. 9E. When the search branch reaches an uplink point 100 to a road mesh 90 of level 1 while tracing backward from the destination 20, a route search is performed by switching to the road mesh 90 of level 1 containing the link corresponding to the uplink point 100, as shown in FIG. 9D. Likewise, when the search branch reaches an uplink point 110 to level 2 (the connecting point from the road mesh 90 of level 1 to the road mesh 70 of level 2) after the route search at level 1, a route search is performed by switching to the road mesh 70 of level 2 shown in FIG. 9C.

Lastly, the route that connects the uplink point 60 in the road mesh 70 of level 2 determined through the route search from the current location 10 to the uplink point 110 in the road mesh 70 of level 2 determined through the route search from the destination 20 is obtained by performing a route search with the use of the road mesh 70 of level 2. In this manner, the entire route from the current location 10 to the destination 20 is determined, and the guide route searching operation comes to an end.

As the above described route search is performed, there is no need to use the road mesh of level 0 covering all the roads from narrow streets to expressways in all the area, when the route from the current location to a destination is to be determined. Accordingly, the time required for the route search can be shortened. On the other hand, during the searching operation in the intermediate area between the current location and the destination, the road mesh of level 0 is not used. As a result, narrow roads are eliminated from the object routes to be searched in the intermediate area, and, even if there is an actual shortcut among the narrow roads, such a short-cut cannot be found.

To counter this problem, a check is made to determine whether the distance of a guide route calculated by a route search is appropriate with respect to the straight-line distance between the current location and the destination. If the distance is determined not to be appropriate (to be a detour), the map data of the lower level is used to perform a re-searching operation. Such a technique is disclosed in Japanese Patent Application Laid-Open No. 10-153447, for example. Specifically, by the technique disclosed in Japanese Patent Application Laid-Open No. 10-153447, when the ratio between the distance of a guide route calculated through a route search and the straight-line distance between the current location and a destination (the distance of the guide route/the straight-line distance of the guide route) is high, a re-searching operation is performed with the use of the map data of the lower level.

Although the above described problem is not to be solved by this technique, there has been a technique for presenting detours at turning points, as well as guide routes, to users (see Japanese Patent Application Laid-Open No. 2002-243476, for example). By this technique, a turning point at which the traveling direction in a guide route changes, and the road type of the guide route also changes, is identified, and a search is performed with the use of the map data of the lower hierarchical level in the surrounding area of the identified turning point.

By the technique disclosed in Japanese Patent Application Laid-Open No. 10-153447, a re-searching operation is performed with the use of the map data of the lower level, only when the ratio between the distance of a guide route and the straight-line distance of the guide route is higher than a threshold value (or when a route having a large detour is found). Therefore, when a route including partial routes 120 and 130 with partial detours is found as shown in FIG. 10A, a re-searching with the use of the map data of the lower level is not performed if the ratio between the distance of the guide route and the straight-line distance of the guide route is not very high and does not exceed the threshold value. In view of this, to perform a re-searching operation even when a route including a partial detour is found, it is necessary to lower the threshold value to be used to determine whether a re-searching operation should be performed.

In such a case, however, a re-searching operation with the use of the map data of the lower level is performed on the entire guide route, unless the distance of the guide route is almost equal to the straight-line distance of the guide route. For example, in a case where a guide route from which a further shortcut is not to be found through a further re-searching operation is found, as shown in FIG. 10B, a re-searching operation is performed on the entire guide route. If the threshold value is made smaller, a detour route is not to be set as a guide route. However, a longer period of time is required for the re-searching operation, and accordingly, a longer period of time is also required for setting an eventual guide route.

By the technique disclosed in Japanese Patent Application Laid-Open No. 2002-243476, a re-searching operation with the use of the map data of the lower hierarchical level is performed in the surrounding areas of turning points in a guide route found with the use of the map data of the upper hierarchical levels, but a re-searching operation is not performed in the other areas. Therefore, there is no guarantee that no detour routes are included in the areas other than the surrounding areas of the turning points in the guide route. That is, the technique disclosed in Japanese Patent Application Laid-Open No. 2002-243476 does not aim to search for a route including no detours in the first place.

SUMMARY

The present invention has been made to solve the above problems, and the object thereof is to prevent a search for a detour route, and shorten the time required for setting an eventual guide route.

According to the present invention, to solve the above problems, a first guide route from a departure point to a destination is found based on map data divided into hierarchical levels based on the amount of information about a road network, and a partial route in which the difference between the straight-line distance and the distance measured along the first guide route between the nodes at both ends is larger than a predetermined value is extracted from the first guide route. A route search between the nodes at both ends of the extracted partial route is performed based on the map data including the lowest level, to obtain a second partial route. The partial route in the first guide route is then replaced with the second partial route, to obtain a second guide route. The second guide route is set as an eventual guide route.

According to the present invention having the above structure, a guide route that is first found is narrowed down to a partial detour portion, and a re-searching operation based on map data including the lowest level is performed on the partial detour portion. Accordingly, a detour route is not readily set as a guide route. Further, a re-searching operation is performed not on an entire guide route that is first found, but only on part of the guide route. Accordingly, the period of time required for the re-searching operation can be made shorter than that in a conventional case where a re-searching operation is performed on the entire guide route that is first found, and the period of time required for setting an eventual guide route can also be made shorter.

BRIEF DESCRIPTION OF THE DRAWINGS

FIGS. 5A through 5D are diagrams showing the processes performed by the guide route search unit according to the first embodiment;

FIGS. 9A through 9E are diagrams showing a guide route searching operation in a conventional navigation device.

DETAILED DESCRIPTION

Figure 1:
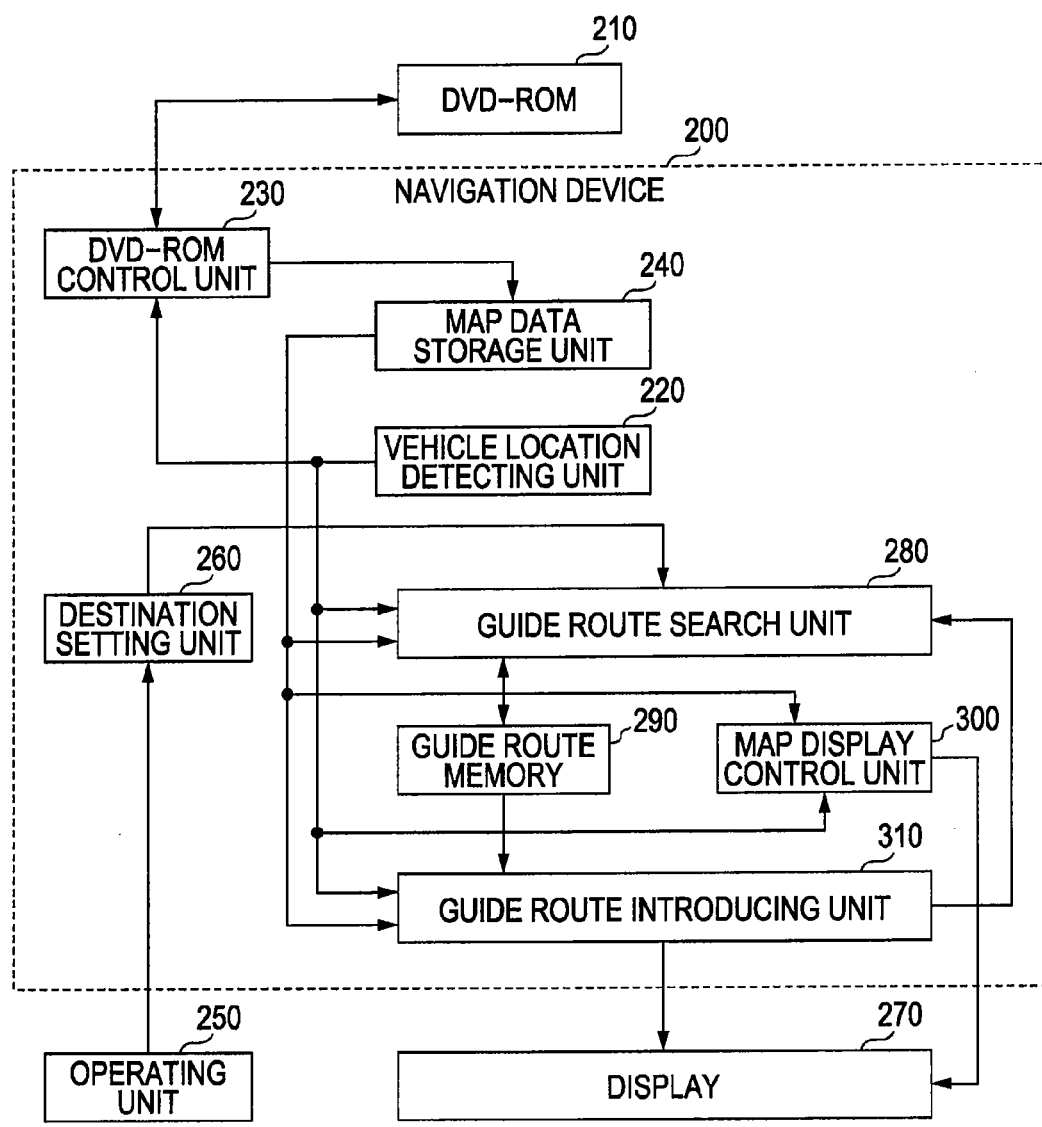
FIG. 1 is a block diagram showing of a navigation device according to a first embodiment.

The following is a description of embodiments of the present invention, with reference to the accompanying drawings. FIG. 1 is a block diagram showing an example structure of a navigation device 200 according to a first embodiment. FIG. 1 shows a recording medium 210 such as a DVD-ROM that stores various kinds of map data necessary for displaying a map or searching for a route.

The map data recorded on the DVD-ROM 210 has a structure that is divided into three hierarchical levels, based on the various amounts of information about a road network. The map data divided into the three hierarchical levels contain a road mesh called level 0 that covers all roads from narrow streets to expressways, a road mesh called level 1 that covers city roads and roads wider than city roads, and a road mesh called level 2 that covers roads such as expressways and toll roads. Those road meshes are distinguished from one another in the map data. In this case, as the level becomes higher, the map data becomes coarser and contains a smaller amount of information about the road network. The map data at each level contains road unit data required for various operations such as map matching and route searches, as well as drawing unit data required for displaying maps.

The road unit contains link information about road links equivalent to respective vectors appearing where roads are specifically divided and are represented by links between vectors, and node information about nodes equivalent to both end points of the respective road links. The node information contains node IDs uniquely identifying nodes, locations (latitudes and longitudes) of the nodes, road links (link IDs) connected to the nodes, flags indicating whether the nodes (diverging points) are equivalent to the end points of the road links, and the like. The link information contains link IDs uniquely identifying road links, nodes (node IDs) connected to both ends of the road links, link costs, road types (open roads and expressways), road attributes, and the like. Although the DVD-ROM 210 is used as a recording medium storing the map data, some other recording medium such as a CD-ROM, a hard disk, or a semiconductor memory may be used.

A vehicle location detecting unit 220 detects the current location of a vehicle at predetermined intervals, and is formed by an independent navigation sensor, a GPS receiver, a location calculating CPU, or the like. The independent navigation sensor includes a vehicle speed sensor (a distance sensor) that detects the movement distance of the vehicle by outputting a pulse at intervals of a predetermined travel distance, and an angular velocity sensor (a relative bearing sensor) such as a vibratory gyroscope that detects the rotation angle (the movement bearing) of the vehicle. The independent navigation sensor detects the relative location and bearing of the vehicle with the vehicle speed sensor and the angular velocity sensor.

The location calculating CPU calculates the absolute location of the vehicle device (an estimated vehicle location) and the bearing of the vehicle, based on the data about the relative location and bearing of the vehicle. The data is output from the independent navigation sensor. The GPS receiver receives radio waves transmitted from GPS satellites, and calculates the absolute location and bearing of the vehicle by performing a three-dimensional positioning operation or a two-dimensional positioning operation (the bearing of the vehicle being calculated based on the location of the vehicle at present and the location of the vehicle measured one sampling time ΔT ago).

A DVD-ROM control unit 230 controls reading of the map data from the DVD-ROM 210. A map data storage unit 240 temporarily stores the map data read from the DVD-ROM 210 under the control of the DVD-ROM control unit 230. That is, the DVD-ROM control unit 230 receives the information about the current location of the vehicle from the vehicle location detecting unit 220, and outputs an instruction to read the map data about a predetermined region including the current location of the vehicle. By doing so, the vehicle location detecting unit 220 reads the map data necessary for displaying maps and searching for guide routes from the DVD-ROM 210, and stores the necessary map data into the map data storage unit 240.

An operating unit 250 is a touch panel, operation switches, or the like. The operating unit 250 is designed for users to set various kinds of information (such as destinations of route guides and routes) in the navigation device 200, and perform various kinds of operations (such as a menu selecting operation, a map enlarging/reducing operation, a manual map scrolling operation, and a numerical value inputting operation) on the navigation device 200.

A destination setting unit 260 sets a spot as a destination on a destination setting operating screen displayed on a display 270. The spot is designated beforehand by a user operating the operating unit 250. The destination setting unit 260 outputs destination information indicating the set destination to a guide route search unit 280.

The guide route search unit 280 sequentially adds link costs of various routes from the location of the vehicle (the departure point) detected by the vehicle location detecting unit 220 to the destination set by the destination setting unit 260, based on the map data stored in the map data storage unit 240. The guide route search unit 280 searches for the guide route having the smallest total sum of link costs.

A guide route memory 290 temporarily stores the data about a guide route (a set of nodes existing between the current location and the destination) as guide route information, when the guide route is found by the guide route search unit 280.

A map display control unit 300 generates map image data about the surrounding area of the vehicle, based on the vehicle location information detected by the vehicle location detecting unit 220 and the map data stored in the map data storage unit 240. The map display control unit 300 then outputs the generated map image data to the display 270, and causes the display 270 to display the map image of the surrounding area of the vehicle.

When a guide route is found by the guide route search unit 280, a guide route introducing unit 310 performs a guide route introducing operation, based on the vehicle location information detected by the vehicle location detecting unit 220, the map data stored in the map data storage unit 240, and the guide route information stored in the guide route memory 290. Specifically, the guide route introducing unit 310 performs a travel guiding operation to the destination of the guide route by causing the display 270 to display a thick line representing the guide route in a different color from other roads on the map image generated by the map display control unit 300. The guide route introducing unit 310 also performs a route guiding operation about a diverging point requiring route guidance on the guide route (such a diverging point will be hereinafter referred to as a guidance diverging point), every time the vehicle approaches a guidance diverging point.

Figure 2:
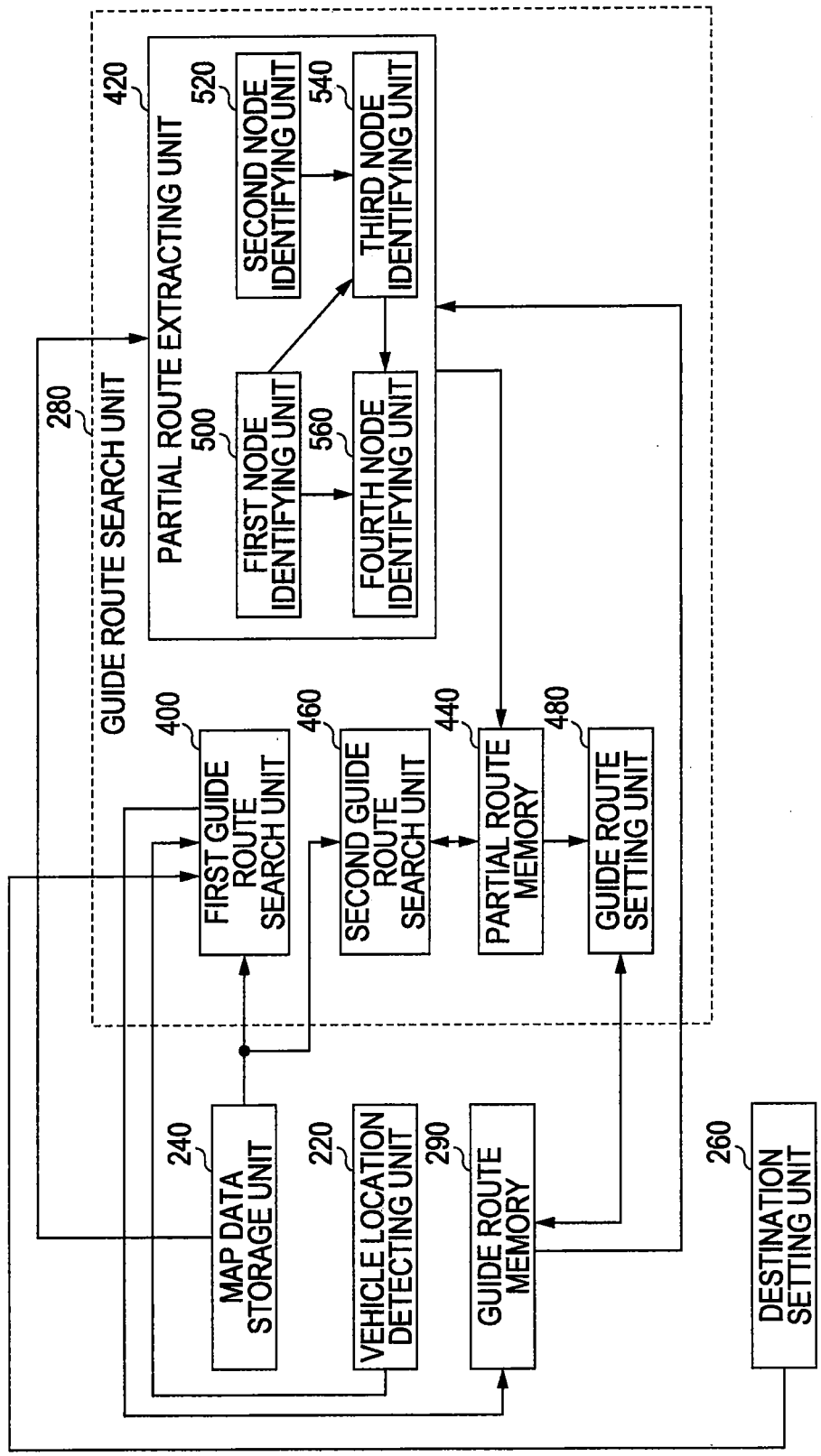
FIG. 2 is a block diagram showing the main structure of the navigation device according to the first embodiment.

Next, the principle functional structure of the navigation device 200 according to the first embodiment will be described. FIG. 2 is a block diagram showing an example of the main structure of the navigation device 200 according to the first embodiment. As shown in FIG. 2, the guide route search unit 280 includes a first guide route search unit 400, a partial route extracting unit 420, a partial route memory 440, a second guide route search unit 460, and a guide route setting unit 480.

The first guide route search unit 400 searches for a first guide route from the current location (equivalent to the departure point in the claims) to the destination indicated by the destination information output from the destination setting unit 260, based on the vehicle location information detected by the vehicle location detecting unit 220 and the map data stored in the map data storage unit 240. Specifically, the first guide route search unit 400 searches for the first guide route from the current location to the destination, by using the map data of the lowest level (level 0) in the surrounding areas of the current location and the destination, and using the map data of the higher levels (levels 1 and 2) than the lowest level in the intermediate region other than the surrounding areas of the departure point and the destination, as in the conventional operation will be described with reference to FIG. 9. The first guide route search unit 400 then stores the data about the detected first guide route (a set of nodes existing between the current location and the destination) as first guide route information into the guide route memory 290.

It should be noted that map data switching from level 0 to level 1 or level 1 to level 2 will be hereinafter referred to as "climbing." Also, nodes at which climbing has actually been performed will be referred to as "climbing nodes." When searching for the first guide route, the first guide route search unit 400 stores climbing node identifying information for identifying climbing nodes into the guide route memory 290.

The partial route extracting unit 420 extracts a partial route having a predetermined value (1.3, for example) or higher as the ratio of the straight-line distance to the distance measured along the first guide route between the nodes at both ends, from the guide route that is found based on the map data about the higher levels (levels 1 and 2) (the guide route will be hereinafter referred to as the "higher search route") in the first guide route found by the first guide route search unit 400. To extract the partial route, the partial route extracting unit 420 includes a first node identifying unit 500, a second node identifying unit 520, a third node identifying unit 540, and a fourth node identifying unit 560.

Based on the climbing node identifying information stored in the guide route memory 290, the first node identifying unit 500 identifies a first node that is the climbing node closest to the current location among the nodes forming the first guide route. The first node identifying unit 500 then outputs first node identifying information indicating the identified first node to the third node identifying unit 540 and the fourth node identifying unit 560.

If climbing is always performed at nodes existing both in the map data of the lowest level (level 0) and in the map data at a higher level (level 1), the node that exists both in the map data of the lowest level and in the map data of the higher level and is closest to the current location may be identified as the first node. In that case, there is no need to refer to the climbing node identifying information.

Based on the climbing node identifying information stored in the guide route memory 290, the second node identifying unit 520 identifies a second node that is the climbing node closest to the destination among the nodes forming the first guide route. The second node identifying unit 520 then outputs second node identifying information indicating the identified second node to the third node identifying unit 540.

If climbing is always performed at nodes existing both in the map data of the lowest level (level 0) and in the map data at a higher level (level 1), the node that exists both in the map data of the lowest level and in the map data of the higher level and is closest to the destination may be identified as the second node. In that case, there is no need to refer to the climbing node identifying information.

In this embodiment, each node existing between the first node and the second node is a first determination object node. Although all the nodes in the first guide route may be first determination object nodes, the load of the determining operations of the third node identifying unit 540 and the fourth node identifying unit 560 can be reduced by narrowing the search range to the higher search route between the first node and the second node.

Based on the map data stored in the map data storage unit 240 and the first guide route information stored in the guide route memory 290, the third node identifying unit 540 sequentially determines whether the ratio of the straight-line distance between the first node and each first determination object node to the distance measured along the first guide route between the first node and the first determination object node is higher than a second predetermined value (1.2, for example) that is lower than a predetermined value, with the first determination object node farthest from the first node being the first one to be subjected to the determination among the first determination object nodes existing between the first node and the second node of the nodes forming the first guide route. The third node identifying unit 540 then identifies a third node that is the first determination object node first determined to have a higher ratio than the second predetermined value, and outputs third node identifying information indicating the identified third node to the fourth node identifying unit 560. Each node existing between the first node and the third node is a second determination object node. The second determination object nodes are part of the first determination object nodes, and the search range of the second determination object nodes is even narrower than the search range of the first determination object nodes.

Based on the map data stored in the map data storage unit 240 and the first guide route information stored in the guide route memory 290, the fourth node identifying unit 560 sequentially determines whether the ratio of the straight-line distance between the third node and each second determination object node to the distance measured along the first guide route between the third node and the second determination object node is higher than the predetermined value (1.3, for example), with the second determination object node farthest from the third node being the first one to be subjected to the determination among the second determination object nodes existing between the first node and the third node of the nodes forming the first guide route. The fourth node identifying unit 560 then identifies a fourth node that is the second determination object node first determined to have a higher ratio than the predetermined value.

The reason that the second predetermined value used in the determining operation of the third node identifying unit 540 differs from the predetermined value used in the determining operation of the fourth node identifying unit 560 is that, if the predetermined value and the second predetermined value are the same, the narrowing can be performed only from one side of the first and second nodes, and accurate narrowing cannot be performed unless a partial detour portion of the first guide route exists in the vicinity of one of the first and second nodes.

Based on the first guide route information stored in the guide route memory 290, the partial route extracting unit 420 extracts the route between the third node and the fourth node as a partial route from the first guide route. The extracted partial route has a narrower range. The partial route extracting unit 420 then stores the data about the extracted partial route (a set of nodes existing between the third node and the fourth node) as partial route information into the partial route memory 440.

Based on the map data (including the data of the lowest level (level 0)) stored in the map data storage unit 240 and the partial route information stored in the partial route memory 440, the second guide route search unit 460 generates a second partial route by performing a route search between the nodes (the third node and the fourth node) at both ends of the partial route extracted by the partial route extracting unit 420. That is, the second guide route search unit 460 performs the same operation as that shown in FIG. 9 only on the partial route. The second guide route search unit 460 then stores the data about the generated second partial route (a set of nodes existing between the third node and the fourth node) as second partial route information into the partial route memory 440.

Based on the first guide route information stored in the guide route memory 290 and the partial route information and second partial route information stored in the partial route memory 440, the guide route setting unit 480 stores the data about a second guide route (a set of node existing between the current location and the destination) as second guide route information into the guide route memory 290. In the second guide route, the partial route of the first guide route is replaced with the second partial route.

Figure 3A:
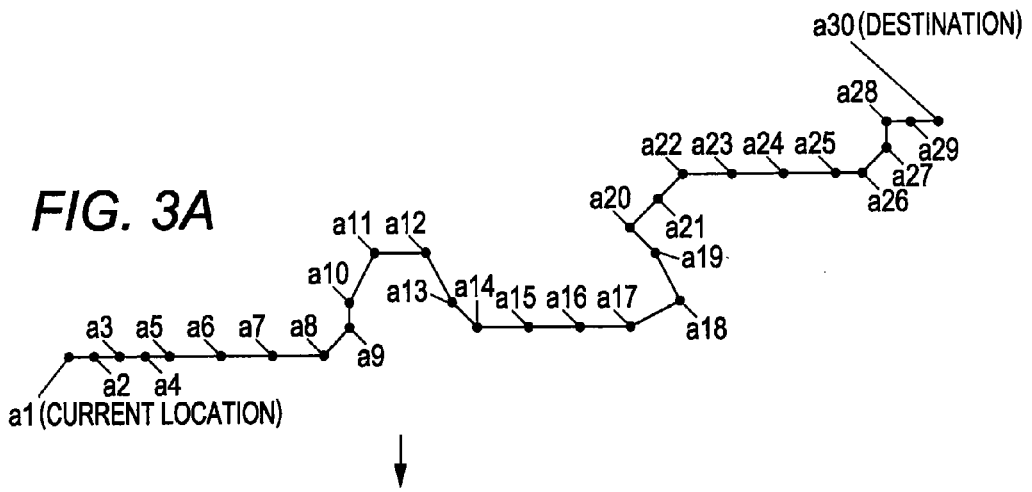
FIGS. 3A through 3D are diagrams showing the processes performed by the guide route search unit according to the first embodiment.

Referring now to FIGS. 3A through 3D, processes to be performed by the guide route search unit 280 according to the first embodiment will be described by way of specific examples. FIGS. 3A through 3D are diagrams for explaining processes to be performed by the guide route search unit 280 according to the first embodiment. FIG. 3A shows all the nodes a1 through a30 forming the first guide route found by the first guide route search unit 400. Those nodes include the nodes found in the map data of level 0, the nodes found in the map data of level 1, and the nodes found in the map data of level 2. In the first guide route, the node a1 represents the current location, and the node a30 represents the destination.

Figure 3B:
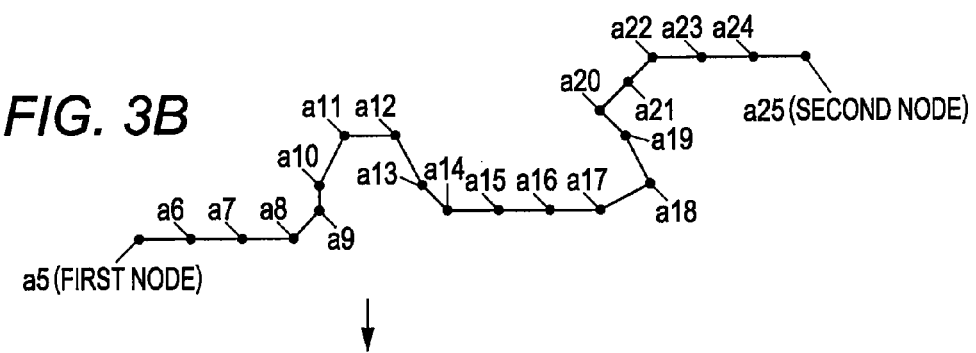

The first node identifying unit 500 identifies the first node that is the climbing node closest to the current location (a point where the map data switches from level 0 to level 1) among the nodes a1 through a30 forming the first guide route. For example, the first node is the node a5. The second node identifying unit 520 identifies the second node that is the climbing node closest to the destination (a point where the map data switches from level 0 to level 1) among the nodes a1 through a30 forming the first guide route. For example, the second node is the node a25. In this embodiment, the nodes a5 through a25 are the first determination object nodes, as shown in FIG. 3B.

Figure 3C:
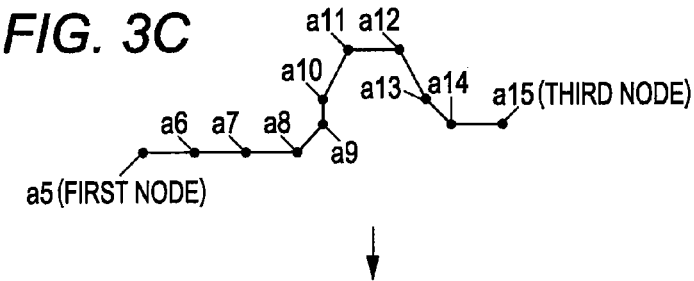

The third node identifying unit 540 then sequentially determines whether the ratio of the straight-line distance between the first node and each first determination object node to the distance measured along the first guide route between the first node and the first determination object node is higher than the second predetermined value (1.2), with the first determination object node farthest from the first node being the first one to be subjected to the determination among the first determination object nodes (the nodes a1 through a25) existing between the first node and the second node of the nodes forming the first guide route. The third node identifying unit 540 then identifies the third node that is the first determination object node first determined to have a higher ratio than the second predetermined value. For example, the third node is the node a15. In this embodiment, the nodes a5 through a15 are the second determination object nodes, as shown in FIG. 3C.

The fourth node identifying unit 560 sequentially determines whether the ratio of the straight-line distance between the third node and each second determination object node to the distance measured along the first guide route between the third node and the second determination object node is higher than the predetermined value (1.3), with the second determination object node farthest from the third node being the first one to be subjected to the determination among the second determination object nodes (the nodes a5 through a15) existing between the first node and the third node of the nodes forming the first guide route. The fourth node identifying unit 560 then identifies the fourth node that is the second determination object node first determined to have a higher ratio than the predetermined value. For example, the fourth node is the node a7.

Figure 3D:
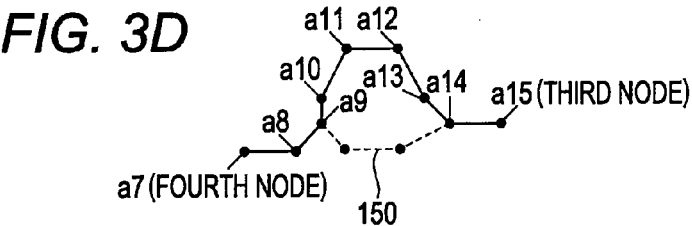

The partial route extracting unit 420 extracts the route between the third node (the node a15) and the fourth node (the node a7) as a partial route from the first guide route, as shown in FIG. 3D. The second guide route search unit 460 uses the map data containing the lowest level (level 0) to perform a route search in the partial route, with the departure point and the destination being the nodes (the node a7 and the node a15) at both ends of the partial route extracted by the partial route extracting unit 420. By doing so, the second guide route search unit 460 generates the second partial route 150. The second partial route 150 is found, because the search is performed with the use of the map data of the lowest level (level 0) in the vicinities of the nodes at both ends of the partial route so that a route not existing in the map data of the higher levels (levels 1 and 2) is found. The guide route setting unit 480 stores the data about the second guide route as the second guide route information into the guide route memory 290. In the second guide route, the partial route of the first guide route is replaced with the second partial route 150.

Figure 4:
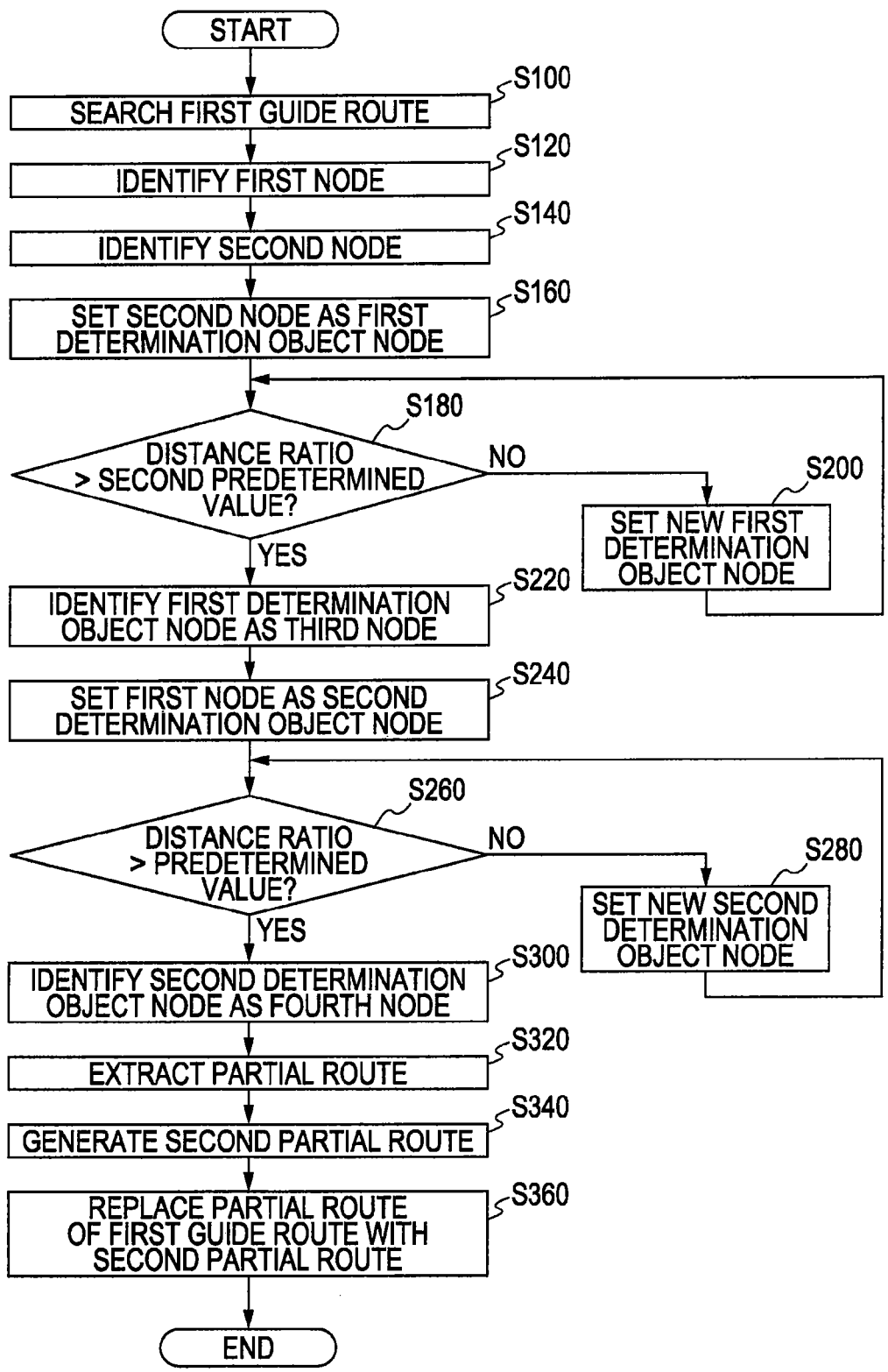
FIG. 4 is a flowchart showing operation of the navigation device according to the first embodiment.

Next, an operation to be performed by the guide route search unit 280 according to this embodiment will be described. FIG. 4 is a flowchart showing an example operation to be performed by the guide route search unit 280 according to this embodiment. The procedure of step S100 in FIG. 4 is started by the guide route search unit 280 receiving a request to search for a guide route through a user operation performed on the operating unit 250.

First, based on the vehicle location information detected by the vehicle location detecting unit 220 and the map data stored in the map data storage unit 240, the first guide route search unit 400 searches for the first guide route from the current location to the destination (step S100). Based on the climbing node identifying information stored in the guide route memory 290, the first node identifying unit 500 then identifies the first node that is the climbing node closest to the current location among the nodes forming the first guide route (step S120).

Based on the climbing node identifying information stored in the guide route memory 290, the second node identifying unit 520 identifies the second node that is the climbing node closest to the destination among the nodes forming the first guide route (step S140).

The third node identifying unit 540 then sets the second node identified by the second node identifying unit 520, as a first determination object node (step S160). Based on the map data stored in the map data storage unit 240 and the first guide route information stored in the guide route memory 290, the third node identifying unit 540 determines whether the ratio of the straight-line distance between the first node and the first determination object node to the distance measured along the first guide route between the first node and the first determination object node is higher than the second predetermined value (1.2) (step S180).

If the third node identifying unit 540 determines that the ratio is not higher than the second predetermined value (NO in step S180), the third node identifying unit 540 sets a new first determination object node that is the node located next to the first determination object node (step S200). The new first determination object node is one node closer to the first node in the first guide route. The operation then returns to step S180. If the third node identifying unit 540 determines that the ratio is higher than the second predetermined value (YES in step S180), the third node identifying unit 540 identifies the third node that is the node set as the first determination object node at that point (step S220).

The fourth node identifying unit 560 then sets the first node identified by the first node identifying unit 500, as a second determination object node (step S240). Based on the map data stored in the map data storage unit 240 and the first guide route information stored in the guide route memory 290, the fourth node identifying unit 560 determines whether the ratio of the straight-line distance between the third node and the second determination object node to the distance measured along the first guide route between the third node and the second determination object node is higher than the predetermined value (1.3) (step S260).

If the fourth node identifying unit 560 determines that the ratio is not higher than the predetermined value (NO in step S260), the fourth node identifying unit 560 sets a new second determination object node that is the node located next to the second determination object node (step S280). The new second determination object node is one node closer to the third node in the first guide route. The operation then returns to step S260. If the fourth node identifying unit 560 determines that the ratio is higher than the predetermined value (YES in step S260), the fourth node identifying unit 560 identifies the fourth node that is the node set as the second determination object node at that point (step S300).

Based on the first guide route information stored in the guide route memory 290, the partial route extracting unit 420 extracts a partial route from the first guide route. The partial route is the route from the third node identified by the third node identifying unit 540 to the fourth node identified by the fourth node identifying unit 560 (step S320). Based on the map data (including the lowest level (level 0)) stored in the map data storage unit 240, the second guide route search unit 460 generates a second partial route by performing a route search between the nodes (the third node and the fourth node)

at both ends of the partial route extracted by the partial route extracting unit 420 (step S340).

Lastly, based on the guide route information stored in the guide route memory 290, the guide route setting unit 480 stores the data about the second guide route (a set of nodes existing between the current location and the destination) as the second guide route information into the guide route memory 290 (step S360). In the second guide route, the partial route of the first guide route is replaced with the second partial route found by the second guide route search unit 460. As the procedure of step S360 is completed, the guide route search unit 280 ends the operation shown in FIG. 4.

As described above in detail, in the first embodiment, a partial route is extracted from the first guide route from the current location (the departure point) to the destination. The first guide route is found by performing climbing, as needed, based on the map data of levels 0 through 2. As for the partial route, the ratio of the straight-line distance to the distance measured along the first guide route between the nodes at both ends is higher than the predetermined value. The second partial route is obtained by performing a search again on the extracted partial route, based on the map data of levels 0 through 2. The second guide route is set by replacing the partial guide route in the first guide route with the found second guide route, and such a second guide route is set as the eventual guide route.

According to the first embodiment having the above described arrangement, a detour portion in the first-found guide route is detected, and a search is again performed on the detected portion, based on the map data containing the lowest level. Accordingly, a detour route is not easily set as a guide route. Furthermore, instead of the entire first-found guide route, only a part of the first-found guide route is subjected to a re-searching process. Accordingly, the time required for the re-searching process can be made shorter than that in a conventional operation in which the entire first-found guide route is subjected to a re-searching process. That is, the time required for setting the eventual guide route can be shortened.

In the first embodiment, the search range in the first guide route is narrowed to the higher search route found based on the map data of the higher levels, and a partial route is extracted from the narrowed range. According to the first embodiment having this arrangement, routes that are found based on the map data of the lowest level are eliminated from the route to be subjected to the partial route extracting process. Even if a re-searching operation is performed on the removed routes, there are no quicker routes than the removed routes, and therefore, removing those routes from the route to be subjected to the partial route extracting operation does not cause any problem. In this manner, the time required for the extracting operation can be shortened, because the partial route extracting operation is not performed on the entire first guide route.

In the above described first embodiment, when the partial route extracting unit 420 extracts a partial route, the first node is identified after the second node is identified. However, the second node may be identified after the first node is identified. Also, in the above described first embodiment, when the partial route extracting unit 420 extracts a partial route, the fourth node is identified after the third node is identified. However, the third node may be identified after the fourth node is identified.

Also, in the above described first embodiment, the partial route extracting unit 420 extracts the route from the third node to the fourth node as a partial route, from the first guide route. However, the present invention is not limited to this. For example, the partial route extracting unit 420 may extract the route from the first node to the third node as a partial node, from the first guide route.

In the above described first embodiment, a re-searching operation to search for a partial route is also performed while climbing is being performed. Therefore, there is a possibility that a detour route is included in the second partial route 150 found as shown in FIG. 3D. To counter this problem, if climbing is performed to search for the second partial route 150, the same operation may be again performed on the second partial route 150.

Specifically, when searching for a second partial route, the second guide route search unit 460 stores climbing node identifying information for identifying climbing nodes into the guide route memory 290. Based on the climbing node identifying information stored in the guide route memory 290, the second guide route search unit 460 determines whether climbing has been performed to search for the second partial route 150 (or whether there is a possibility that a partial detour exists in the second partial route 150). If the second guide route search unit 460 determines that climbing has been performed to search for the second partial route 150, the second guide route search unit 460 informs the partial route extracting unit 420 to that effect.

If the partial route extracting unit 420 receives the notification from the second guide route search unit 460 to the effect that climbing has been performed to search for the second partial route 150, the partial route extracting unit 420 extracts a third partial route from the second partial route. In the third partial route, the ratio of the straight-line distance to the distance measured along the second partial route between the nodes at both ends is higher than a predetermined value. This extracting operation is the same as the operation will be described with reference to FIGS. 3A through 3D.

Based on the map data (including the lowest level (level 0)) stored in the map data storage unit 240 and the third partial route information stored in the partial route memory 440, the second guide route search unit 460 generates a fourth partial route by performing a route search between the nodes at both ends of the third partial route. The second guide route search unit 460 then stores the data about the generated fourth partial route as fourth partial route information into the partial route memory 440.

Based on the second guide route information stored in the guide route memory 290 and the third partial route information and fourth partial route information stored in the partial route memory 440, the guide route setting unit 480 stores the data about a third guide route (a set of nodes existing between the current location and the destination) as third guide route information into the guide route memory 290. In the third guide route, the third partial route of the second guide route is replaced with the fourth partial route.

With this structure, even if the second partial route 150 found through a re-searching operation includes a partial detour route, the partial detour route can be certainly eliminated, and an even shorter guide route can be obtained. If climbing still occurs when the fourth partial route is determined through the second re-searching operation, a third re-searching operation may be performed in the same manner as above.

In the above described embodiment, only one partial route is extracted from the first guide route from the current location to the destination, and a re-searching operation is performed. However, there is a possibility that there is a detour route other than that. Therefore, when a re-searching operation is completed on a partial route, another partial route may be extracted from some other region, and a re-searching operation may be performed on the other partial route.

Specifically, the partial route extracting unit 420 extracts a fifth partial route from the remaining route obtained by removing the second partial route (the route formed by the nodes a9 through a14 shown in FIG. 3D) from the second guide route (or the third guide route if a further re-searching operation is performed, which will also apply to the cases described hereafter). As for the fifth partial route, the ratio of the straight-line distance to the distance measured along the second guide route between the nodes at both ends is higher than a predetermined value (1.3, for example). The partial route extracting unit 420 then stores the data about the extracted fifth partial route as fifth partial route information into the partial route memory 440. It should be noted that the remaining route may be the route obtained by removing the partial route (the route formed by the nodes a7 through a15 shown in FIG. 3D) from the second guide route, instead of the route obtained by removing the second partial route from the second guide route.

Based on the map data (including the lowest level (level 0)) stored in the map data storage unit 240 and the fifth partial route information stored in the partial route memory 440, the second guide route search unit 460 generates a sixth partial route by performing a route search between the nodes at both ends of the fifth partial route. The second guide route search unit 460 stores the data about the generated sixth partial route as sixth partial route information into the partial route memory 440.

Based on the second guide route information stored in the guide route memory 290 and the fifth partial route information and sixth partial route information stored in the partial route memory 440, the guide route setting unit 480 stores the data about a fourth guide route (a set of nodes existing between the current location and the destination) as fourth guide route information into the guide route memory 290. In the fourth guide route, the fifth partial route of the second guide route is replaced with the sixth partial route.

Referring now to FIGS. 5A through 5D, a specific example of processes to be performed by the guide route search unit 280 will be described. FIGS. 5A through 5D are diagrams for explaining processes to be performed after the guide route search unit 280 finds the second partial route 150 as shown in FIGS. 3A through 3D and stores the second partial route information into the guide route memory 290. FIGS. 5A through 5D show nodes a15 through a30 that are nodes located in the remaining route on the destination (the node a30) side of the node a15 in the route obtained by removing the partial route 150 from the second guide route.

The first node identifying unit 500 identifies the first node that is the climbing node closest to the node a15 among the nodes a15 through a30 forming the remaining route. For example, the first node is the node a15. In searching for the first guide route, climbing might be performed up to the highest level (level 2) on the current location side of the node a15. In that case, the climbing node closest to the node a15 does not exist among the nodes a15 through a30. Therefore, the node a15 is set as the first node in that case.

The second node identifying unit 520 identifies the second node that is the climbing node closest to the destination (a point where the map data switches from level 0 to level 1) among the nodes a15 through a30 forming the remaining route. For example, the second node is the node a25. In this embodiment, the nodes a15 through a25 are set as the first determination object nodes as shown in FIG. 5B.

The third node identifying unit 540 then sequentially determines whether the ratio of the straight-line distance between the first node and each first determination object node to the distance measured along the first guide route between the first node and the first determination object node is higher than the second predetermined value (1.2), with the first determination object node farthest from the first node being the first one to be subjected to the determination among the respective first determination object nodes (the nodes a15 through a25) existing between the first node and the second node of the nodes forming the remaining route. The third node identifying unit 540 then identifies the third node that is the first determination object node first determined to have a higher ratio than the second predetermined value. For example, the third node is the node a19. In this embodiment, the nodes a15 through a19 are set as the second determination object nodes as shown in FIG. 5C.

The fourth node identifying unit 560 then sequentially determines whether the ratio of the straight-line distance between the third node and each second determination object node to the distance measured along the first guide route between the third node and the second determination object node is higher than the predetermined value (1.3), with the second determination object node farthest from the third node being the first one to be subjected to the determination among the respective second determination object nodes (the nodes a15 through a19) existing between the first node and the third node of the nodes forming the remaining route. The fourth node identifying unit 560 then identifies the fourth node that is the second determination object node first determined to have a higher ratio than the predetermined value. For example, the fourth node is the node a16.

The partial route extracting unit 420 extracts the route from the third node (the node a19) to the fourth node (the node a16) as the fifth partial route, from the remaining route, as shown in FIG. 5D. The second guide route search unit 460 uses the map data including the lowest level (level 0), and performs a route search in the partial route, with the departure point and the destination being the nodes (the node a16 and the node a19) at both ends of the fifth partial route extracted by the partial route extracting unit 420. In this manner, the sixth partial route 160 is generated.

If the third node, which is the end point on the destination side of the fifth partial route extracted from the remaining route, is located two or more nodes before the second node, a re-searching operation is performed on other locations in the remaining route by repeating the same operation as above. Also, the same operation is performed on the area on the current location side of the node a7. With this arrangement, even if the remaining route obtained by narrowing the search range and removing the route found through a re-searching operation includes a partial detour route, the partial detour route can be certainly eliminated, and an even shorter guide route can be obtained.

Figure 6:
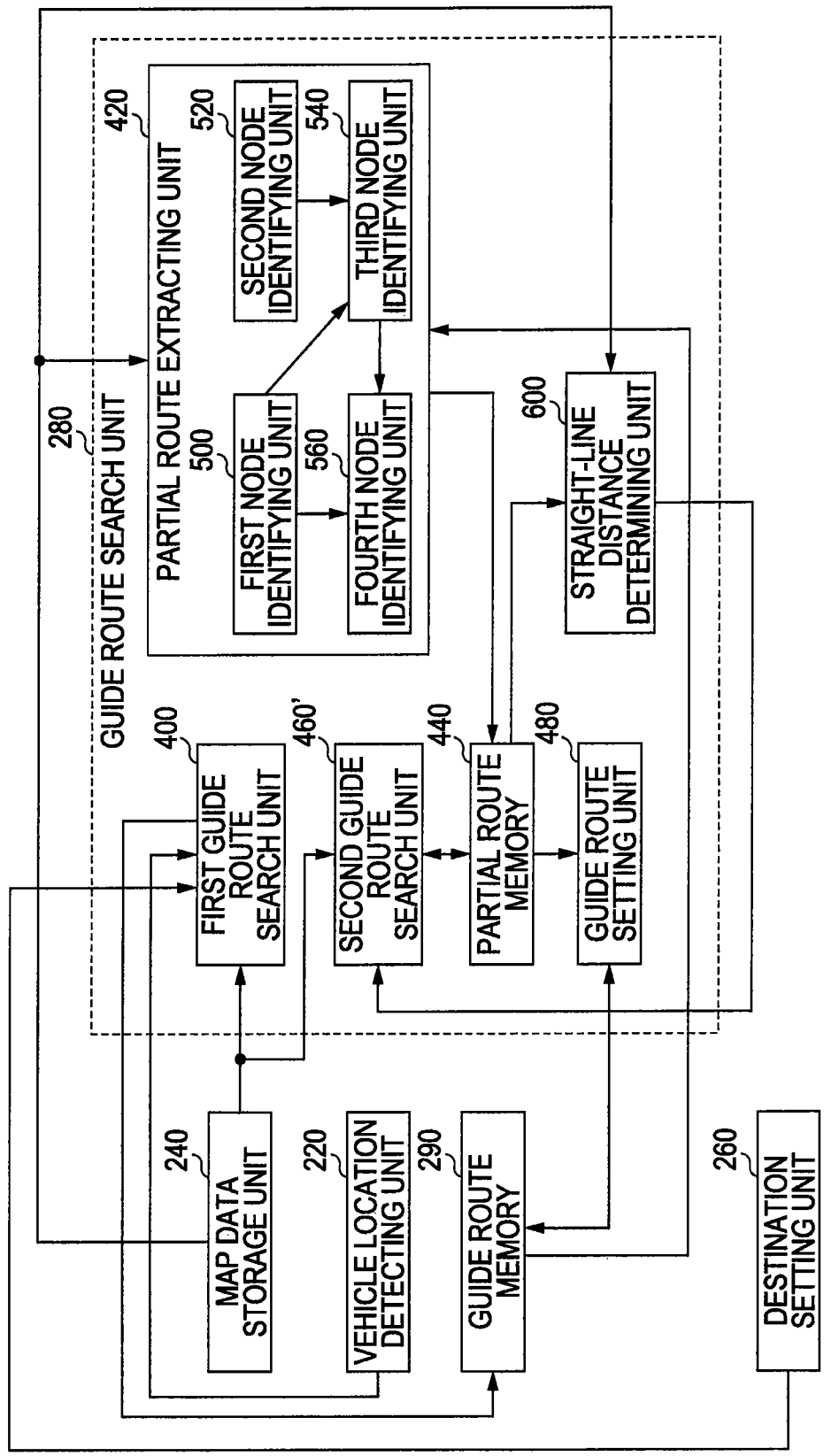
FIG. 6 is a block diagram showing the structure of a navigation device according to a second embodiment.

Next, a second embodiment of the present invention will be described, with reference to the accompanying drawings. FIG. 6 is a block diagram showing an example main structure of the navigation device 200 according to the second embodiment. As shown in FIG. 6, the guide route search unit 280 further includes a straight-line distance determining unit 600 as a functional structure. Also, the guide route search unit 280 includes a second guide route search unit 460', instead of the second guide route search unit 460 of FIG. 2, as a functional structure. In FIG. 6, the components denoted by the same reference numerals as those used in FIG. 2 have the same functions as those shown in FIG. 2, and therefore, explanation of them will not be repeated herein.

Based on the map data stored in the map data storage unit 240 and the partial route information stored in the partial route memory 440, the straight-line distance determining unit 600 determines whether the straight-line distance between the nodes at both ends of a partial route extracted by the partial route extracting unit 420 is shorter than a predetermined distance, and notifies the second guide route search unit 460' of the result of the determination.

Upon receipt of a notification from the straight-line distance determining unit 600 to the effect that the straight-line distance between the nodes at both ends of the partial route is shorter than the predetermined distance, the second guide route search unit 460' generates a second partial route by performing a route search between the nodes (the third node and the fourth node) at both ends of the partial route extracted by the partial route extracting unit 420, based on the map data (only the lowest level (level 0)) stored in the map data storage unit 240 and the partial route information stored in the partial route memory 440.

Upon receipt of a notification from the straight-line distance determining unit 600 to the effect that the straight-line distance between the nodes at both ends of the partial route is not shorter than the predetermined distance, the second guide route search unit 460' generates a second partial route by performing a route search between the nodes (the third node and the fourth node) at both ends of the partial route extracted by the partial route extracting unit 420, based on the map data (including the lowest level (level 0)) stored in the map data storage unit 240 and the partial route information stored in the partial route memory 440.

If the straight-line distance between the nodes at both ends of the partial route is shorter than the predetermined distance, the distance of the partial route is short. Therefore, even if a route search is performed only with the specific map data of the lowest level, there should be only a low possibility that a long period of time is required for a re-searching operation. Further, a route search is performed only with the use of the map data of the lowest level covering all the roads, without climbing. Accordingly, the shortest guide route can be certainly found. Thus, the shortest route without a detour can be found from a partial route, while the re-searching period of time is not prolonged.

Figure 7:
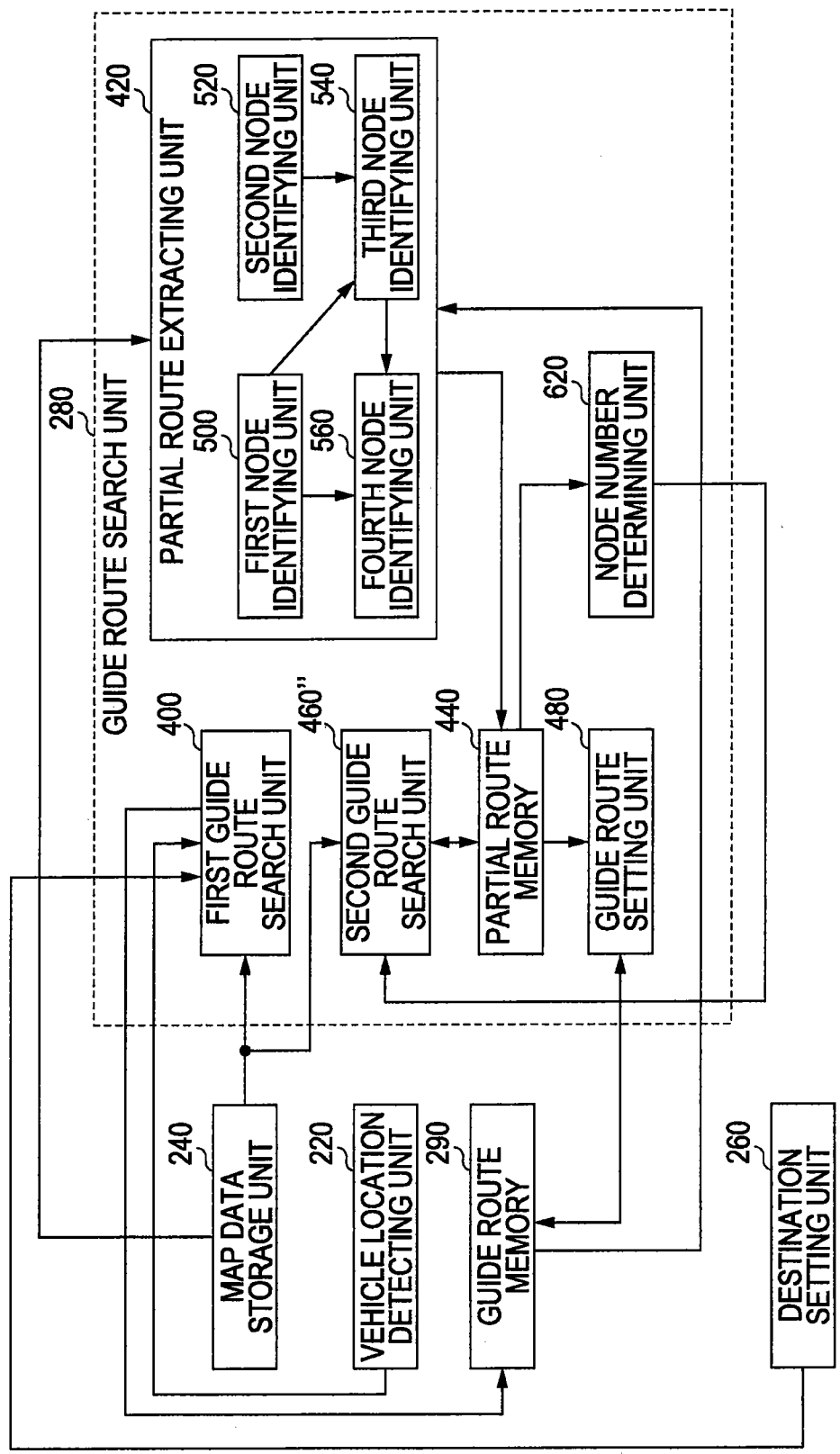
FIG. 7 is a block diagram showing a modification of the structure of a navigation device according to the second embodiment.

A check may be made to determine whether a route search is to be performed only with the specific map data of the lowest level, based on the number of nodes existing between the nodes at both ends of the partial route, instead of the straight-line distance between the nodes at both ends of the partial route. FIG. 7 is a block diagram showing an example main structure of the navigation device 200 in a case where the check is made based on the number of nodes. As shown in FIG. 7, the guide route search unit 280 further includes a node number determining unit 620 as a functional structure. Also, the guide route search unit 280 includes a second guide route search unit 460", instead of the second guide route search unit 460 of FIG. 2, as a functional structure. In FIG. 7, the components denoted by the same reference numerals as those used in FIG. 2 have the same functions as those shown in FIG. 2, and therefore, explanation of them will not be repeated herein.

Based on the partial route information stored in the partial route memory 440, the node number determining unit 620 determines whether the number of nodes existing between the nodes at both ends of a partial route extracted by the partial route extracting unit 420 is smaller than a predetermined number, and notifies the second guide route search unit 460" of the result of the determination.

Upon receipt of a notification from the node number determining unit 620 to the effect that the number of nodes existing between the nodes at both ends of the partial route is smaller than the predetermined number, the second guide route search unit 460" generates a second partial route by performing a route search between the nodes (the third node and the fourth node) at both ends of the partial route extracted by the partial route extracting unit 420, based on the map data (only the lowest level (level 0)) stored in the map data storage unit 240 and the partial route information stored in the partial route memory 440.

Upon receipt of a notification from the node number determining unit 620 to the effect that the number of nodes existing between the nodes at both ends of the partial route is not smaller than the predetermined number, the second guide route search unit 460" generates a second partial route by performing a route search between the nodes (the third node and the fourth node) at both ends of the partial route extracted by the partial route extracting unit 420, based on the map data (including the lowest level (level 0)) stored in the map data storage unit 240 and the partial route information stored in the partial route memory 440.

With this arrangement, the same effects as those in the case where a check is made based on the straight-line distance as in FIG. 6 can be achieved. That is, if the number of nodes existing between the nodes at both ends of the partial route is smaller than the predetermined distance, the distance of the partial route is short. Therefore, even if a route search is performed only with the specific map data of the lowest level, there should be only a low possibility that a long period of time is required for a re-searching operation. Further, a route search is performed only with the use of the map data of the lowest level covering all the roads, without climbing. Accordingly, the shortest guide route can be certainly found. Thus, the shortest route without a detour can be found from a partial route, while the re-searching period of time is not prolonged.

Figure 8:
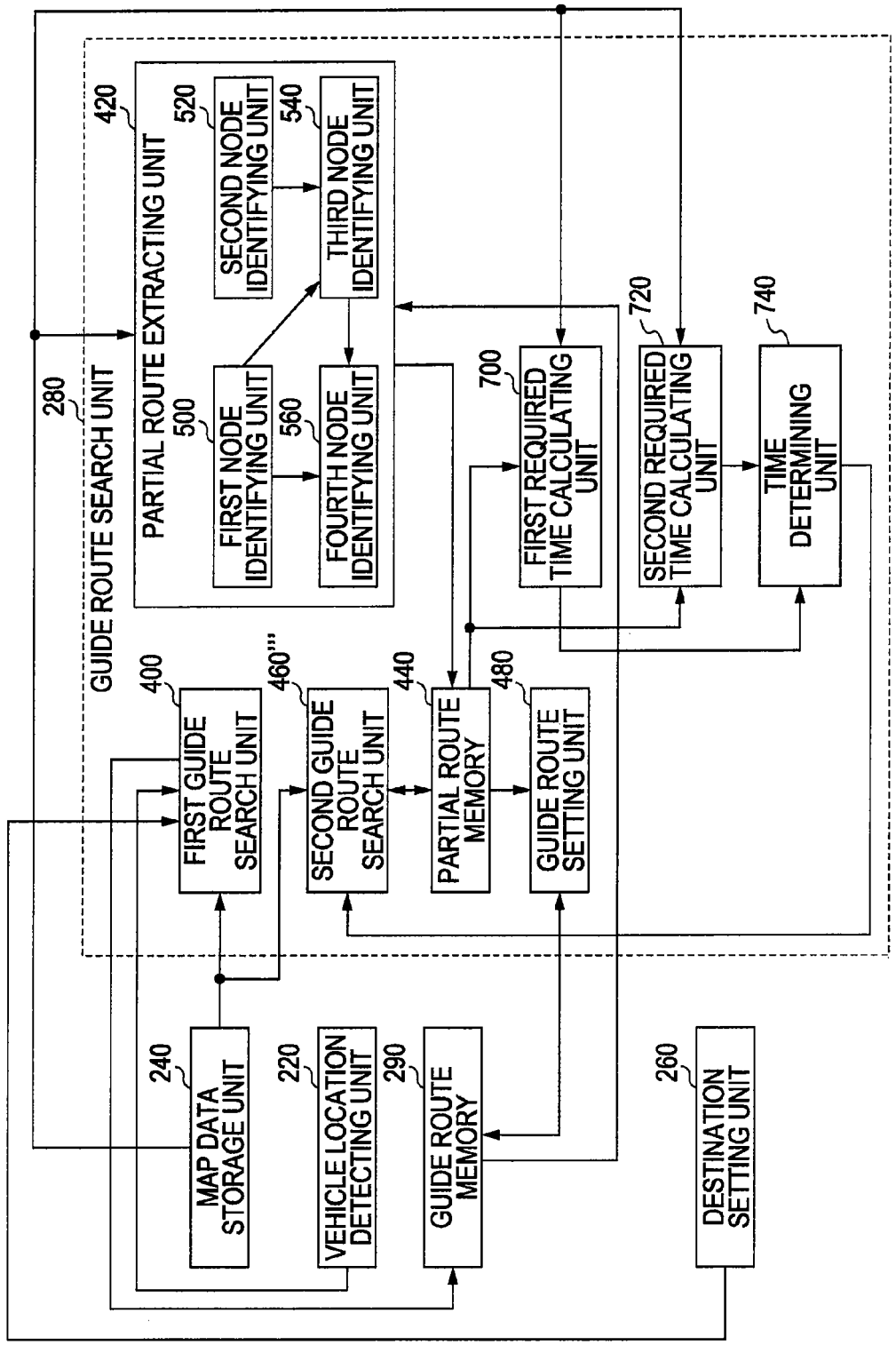
FIG. 8 is a block diagram showing the structure of a navigation device according to a third embodiment.
Figure 10A:
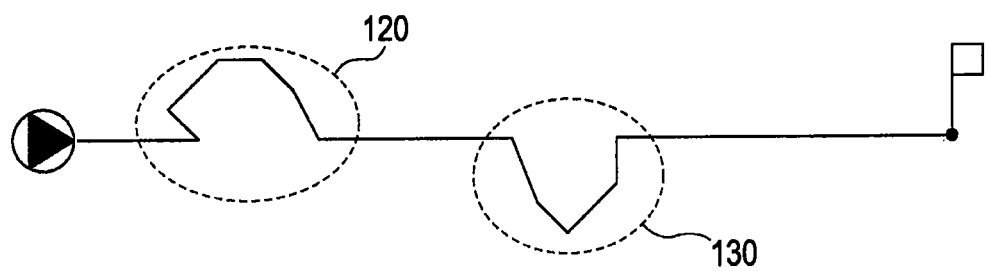
FIGS. 10A and 10B are diagrams showing guide routes found by a conventional navigation device.
Figure 10B:

Next, a third embodiment of the present invention will be described, with reference to the accompanying drawings. FIG. 8 is a block diagram showing an example main structure of the navigation device 200 according to the third embodiment. As shown in FIG. 8, the guide route search unit 280 further includes a first required time calculating unit 700, a second required time calculating unit 720, and a time determining unit 740 as functional structures. Also, the guide route search unit 280 includes a second guide route search unit 460'", instead of the second guide route search unit 460 of FIG. 2, as a functional structure. In FIG. 8, the components denoted by the same reference numerals as those used in FIG. 2 have the same functions as those shown in FIG. 2, and therefore, explanation of them will not be repeated herein.

Based on the map data (the link information (link cost) about the road unit) stored in the map data storage unit 240 and the partial route information stored in the partial route memory 440, the first required time calculating unit 700 calculates a first required time that is the travel time required for traveling on a partial route extracted by the partial route extracting unit 420. The first required time calculating unit 700 then outputs first required time information indicating the calculated first required time to the time determining unit 740.

Based on the map data (the node information (latitudes and longitudes) about the road unit) stored in the map data storage unit 240 and the partial route information stored in the partial route memory 440, the second required time calculating unit 720 calculates a second required time that is the time obtained by dividing the straight-line distance between the nodes at both ends of the partial route extracted by the partial route extracting unit 420, by a predicted travel speed in accordance with the type of the road contained only in the map data one level lower than the map data used in the search for the partial route. The second required time calculating unit 720 then outputs second required time information indicating the calculated second required time to the time determining unit 740.

The time determining unit 740 determines whether the second required time indicated by the second required time information output from the second required time calculating unit 720 is longer than the first required time indicated by the first required time information output from the first required time calculating unit 700, and notifies the second guide route search unit 460''' of the result of the determination.

A specific example will now be described. The partial route is an expressway. Also, the type of the road included only in the map data one level lower than the map data used in the search for the partial route is an open road, and the predicted travel speed in accordance with the road type is 40 km/h. In this case, when the first required time is longer than the second required time, traveling on the partial route is faster than traveling on the open road, even if the partial route is a detour route.

Upon receipt of a notification to the effect that the second required time is not longer than the first required time, the second guide route search unit 460''' uses the map data containing the lowest level (level 0) to perform a route search between the nodes at both ends of the partial route. Upon receipt of a notification to the effect that the second required time is longer than the first required time, the second guide route search unit 460''' does not perform a route search between the nodes at both ends of the partial route.

According to the third embodiment having the above structure, an unnecessary re-searching operation is not performed on a partial route, if the route to be extracted from the partial route with the use of the map data of the lowest level is considered to be more time-consuming than the route already found with the use of the map data at a higher level.

In the above described first through third embodiments, the map data is divided into three hierarchical levels, based on the variation in the amount of information about the road network. However, the present invention is not limited to that. For example, the map data may be divided into two hierarchical levels, or may be divided into four or more hierarchical levels, based on the variation in the amount of information about the road network.

In the above described first through third embodiments, a partial route in which the ratio of the straight-line distance to the distance measured along the first guide route between the nodes at both ends is equal to or higher than a predetermined value is extracted from the first guide route. However, the present invention is not limited to that. For example, a partial route in which the distance obtained by subtracting the straight-line distance from the distance measured along the first guide route between the nodes at both ends is longer than a predetermined distance may be extracted from the first guide route.

Although preferred embodiments have been described in detail, the present invention is not limited to these specific embodiments of the present invention. Rather, various modifications and changes can be made without departing from the scope of the present invention as described in the accompanying claims. Accordingly, all such modifications are intended to be included within the scope of this invention as defined in the following claims.

What is claimed is:

1. A navigation device comprising:
   a vehicle location detecting unit having a CPU, and configured to receive distance or speed information from one or more sensors;
   a map data storage unit operatively coupled to the vehicle detecting unit and CPU to store map data, the map data divided into a plurality of hierarchical levels based on an amount of information about a road network, wherein the amount of information is greater at a lower level of the hierarchical levels than at a higher level of the hierarchical levels;
   a first guide route search unit operatively coupled to the vehicle detecting unit and CPU, to search for a first guide route from a departure point to a destination point by using the map data of the lowest level corresponding to an area surrounding the departure point and the destination point, respectively, and using the map data of levels higher than the lowest level corresponding to an intermediate region outside the area surrounding the departure point and the destination point, respectively;
   a partial route extracting unit operatively coupled to the vehicle detecting unit and CPU, to extract a first partial route from the first guide route, the first partial route having a ratio between a straight-line distance and a distance measured between nodes at opposite ends thereof being greater than a predetermined value, the partial route extracting unit further including:
      a first node identifying unit configured to identify a first node that is closest to one end of the first guide route among nodes forming the first guide route, wherein levels of the map data are changed at the first node;
      a second node identifying unit configured to identify a second node that is closest to the other end of the first guide route, wherein levels of the map data are changed at the second node, wherein the partial route extracting unit is configured to extract the first partial route from the higher search route formed by nodes between the first node and the second node;
   a second guide route search unit operatively coupled to the vehicle detecting unit and CPU, to generate a second partial route by performing a route search between nodes at opposite ends of the first partial route using the map data including the lowest level;
   a guide route setting unit operatively coupled to the vehicle detecting unit and CPU, to set an eventual guide route representing a second guide route formed by replacing the first partial route of the first guide route with the second partial route;
   a node number determining unit operatively coupled to the vehicle detecting unit and CPU, to determine whether the number of nodes between the nodes at opposite ends of the first partial route is less than a predetermined number to facilitate the route search between the nodes at opposite ends of the first partial route by the second guide route search unit; and
   a straight-line distance determining unit operatively coupled to the vehicle detecting unit and CPU, to determine whether the straight-line distance between nodes at opposite ends of the first partial route is shorter than a predetermined distance, and wherein, if the straight-line distance between the nodes at opposite ends of the first partial route is less than the predetermined distance, the second guide route search unit performs the route search between the nodes at opposite ends of the first partial route by using only the map data of the lowest level.

2. The navigation device according to claim 1, wherein the partial route extracting unit extracts the first partial route from a higher search route found from the first guide route, based on the map data of the higher levels of the hierarchical levels.

3. The navigation device according to claim 2, wherein
the partial route extracting unit further includes a third node identifying unit configured to sequentially determine whether a ratio between a straight-line distance between the first node and each of a plurality of determination object nodes, and a distance measured along the higher search route between the first node and the corresponding determination object node, is larger than the predetermined value,
wherein a determination object node farthest from the first node is selected as the first node to be subjected to the determination among the plurality of determination object nodes forming the higher search route,
the third node identifying unit configured to identify a third node that is a determination object node first determined to have a larger difference value than the predetermined value, and
wherein the partial route extracting unit is configured to extract a route between the first node and the third node as the partial route among the nodes forming the higher search route.

4. The navigation device according to claim 2, wherein
the partial route extracting unit further includes:
  a third node identifying unit configured to sequentially determine whether a ratio between a straight-line distance between the first node and each determination object node, and a distance measured along the higher search route between the first node and the determination object node, is larger than a second predetermined value, wherein the second predetermined value is less than the predetermined value;
  wherein a determination object node farthest from the first node is selected as the first node to be subjected to the determination among the determination object nodes forming the higher search route;
  the third node identifying unit identifying a third node that is a determination object node first determined to have a larger difference value than the second predetermined value; and
  a fourth node identifying unit configured to sequentially determine whether a ratio between a straight-line distance between the third node and each determination object node, and a distance measured along the higher search route between the third node and the determination object node, is larger than the predetermined value;
  wherein a determination object node farthest from the third node is selected as the first node to be subjected to the determination among the determination object nodes between the first node and the third node of the nodes forming the higher search route;
  the fourth node identifying unit configured to identify a fourth node that is a determination object node first determined to have a larger difference value than the predetermined value, and
  wherein the partial route extracting unit is configured to extract a route between the third node and the fourth node as the partial route from the higher search route.

5. The navigation device according to claim 1, further comprising:
the node number determining unit configured to determine whether the number of nodes between the nodes at opposite ends of the first partial route is less than a predetermined number; and
wherein, if the number of nodes between the nodes at opposite ends of the first partial route is less than the predetermined number, the second guide route search unit performs the route search between the nodes at opposite ends of the first partial route using only the map data of the lowest level.

6. The navigation device according to claim 1, wherein,
when the second partial route is found by the second guide route search unit using the map data of the higher levels, the partial route extracting unit extracts a third partial route from the second partial route, wherein a difference between a straight-line distance and a distance measured along the second partial route between nodes at opposite ends of the third partial route is greater than the predetermined value,
the second guide route search unit generates a fourth partial route by performing a route search between the nodes at opposite ends of the third partial route using map data containing the lowest level, and
the guide route setting unit sets an eventual guide route representing a third guide route formed by replacing the third partial route of the second guide route with the fourth partial route.

7. The navigation device according to claim 1, wherein
the partial route extracting unit further extracts a fifth partial route from a route formed by subtracting the second partial route from the second guide route, wherein a ratio between a straight-line distance, and a distance measured along the second guide route between nodes at opposite ends of the fifth partial route is greater than a predetermined value;
the second guide route search unit generates a sixth partial route by performing a route search between the nodes at opposite ends of the fifth partial route extracted by the partial route extracting unit, using the map data including the lowest level; and
the guide route setting unit sets an eventual guide route representing a fourth guide route formed by replacing the fifth partial route in the second guide route with the sixth partial route.

8. The navigation device according to claim 1, further comprising:
  a first required time calculating unit configured to calculate a first required time required for traveling on the first partial route;
  a second required time calculating unit configured to calculate a second required time by dividing the straight-line distance between the nodes at opposite ends of the first partial route by a predicted travel speed in accordance with a type of road included only in map data one level lower than the map data used in the search for the first partial route;
  a time determining unit configured to determine whether the second required time is greater than the first required time; and
  wherein the second guide route search unit performs the route search between the nodes at opposite ends of the first partial route by using the map data including the lowest level, only when the time determining unit determines that the second required time is not greater than the first required time.

9. A guide route search method in a navigation device having a vehicle location detecting unit and CPU, and receiving distance or speed information from one or more sensors, the method comprising:
  storing map data, by a map data storage unit, the map data divided into a plurality of hierarchical levels based on an amount of information about a road network, wherein the amount of information is greater at a lower level of the hierarchical levels than at a higher level of the hierarchical levels; and searching, by a first guide route search unit operatively coupled to the vehicle detecting unit and CPU, for a first guide route from a departure point to a destination point by using the map data of the lowest level corresponding to an area surrounding the departure point and the destination point, respectively, and using the map data of levels higher than that of the lowest level, corresponding to an intermediate region outside the area surrounding the departure point and the destination point, respectively;

extracting a first partial route from the first guide route, the first partial route having a ratio between a straight-line distance and a distance measured between nodes at opposite ends thereof being greater than a predetermined value, wherein extracting the first partial route further includes:

identifying a first node that is closest to one end of the first guide route among nodes forming the first guide route, wherein levels of the map data are switched at the first node;

identifying a second node that is closest to the other end of the first guide route, wherein levels of the map data are switched at the second node; and extracting the first partial route from the higher search route formed by nodes between the first node and the second node;

generating a second partial route by performing a route search between nodes at opposite ends of the first partial route using the use of the map data including the lowest level;

setting an eventual guide route representing a second guide route formed by replacing the first partial route of the first guide route with the second partial route; and determining, using a node number determining unit operatively coupled to the vehicle detecting unit and CPU, whether the number of nodes between the nodes at opposite ends of the first partial route is less than a predetermined number to facilitate the route search between the nodes at opposite ends of the first partial route; and determining, using a straight-line distance determining unit operatively coupled to the vehicle detecting unit and CPU, whether the straight-line distance between nodes at opposite ends of the first partial route is shorter than a predetermined distance, and wherein, if the straight-line distance between the nodes at opposite ends of the first partial route is less than the predetermined distance, the performing the route search between the nodes at opposite ends of the first partial route by using only the map data of the lowest level.

10. The guide route search method according to claim 9, wherein the extracting the first partial route includes extracting the first partial route from a higher search route found from the first guide route, based on the map data of the higher levels of the hierarchical levels.

11. The guide route search method according to claim 10, wherein the extracting the first partial route further includes:

sequentially determining whether a difference between a straight-line distance between the first node and each determination object node, and a distance measured along the higher search route between the first node and the determination object node, is larger than the predetermined value;

wherein a determination object node farthest from the first node is selected as the first node to be subjected to the determination among the determination object nodes forming the higher search route;

identifying a third node that is a determination object node first determined to have a larger difference value than the predetermined value; and extracting a route from the first node to the third node as the first partial route among the nodes forming the higher search route.

12. The guide route search method according to claim 10, wherein the extracting the first partial route further includes:

sequentially determining whether a difference between a straight-line distance between the first node and each determination object node, and a distance measured along the higher search route between the first node and the determination object node, is larger than a second predetermined value smaller than the predetermined value;

wherein a determination object node farthest from the first node is selected as the first node to be subjected to the determination among the determination object nodes forming the higher search route;

identifying a third node that is a determination object node first determined to have a larger difference value than the second predetermined value;

sequentially determining whether a difference between a straight-line distance between the third node and each determination object node, and a distance measured along the higher search route between the third node and the determination object node, is larger than the predetermined value, wherein a determination object node farthest from the third node is selected as the first node to be subjected to the determination among the determination object nodes between the first node and the third node forming the higher search route;

identifying a fourth node that is a determination object node first determined to have a larger difference value than the predetermined value; and extracting a route between the third node and the fourth node as the first partial route from the higher search route.

13. The guide route search method according to claim 9, wherein extracting the first partial route includes determining whether the straight-line distance between the nodes at opposite ends of the first partial route is shorter than a predetermined distance, and generating the second partial route includes performing the route search between the nodes at opposite ends of the first partial route using only the map data of the lowest level, when the straight-line distance between the nodes at opposite ends of the first partial route is determined to be shorter than the predetermined distance.

14. The guide route search method according to claim 9, wherein extracting the partial route includes determining whether the number of nodes between the nodes at opposite ends of the first partial route is less than a predetermined number, and generating the second partial route includes performing the route search between the nodes at opposite ends of the first partial route by using only the map data of the lowest level, when the number of nodes between the nodes at opposite ends of the first partial route is determined to be less than the predetermined number.

* * * * *